US012784962B2

(12) United States Patent
Chen et al.

(10) Patent No.: US 12,784,962 B2
(45) Date of Patent: Nov. 3, 2026

(54) TRANSFORMER

(71) Applicant: LITE-ON Technology Corporation, Taipei City (TW)

(72) Inventors: Chen Chen, Taipei City (TW); De-Jia Lu, Taipei City (TW); Yong-Long Syu, Taipei City (TW); Kai-De Chen, Taipei City (TW); Chao-Lin Chung, Taipei City (TW)

(73) Assignee: LITE-ON Technology Corporation, Taipei (TW)

( * ) Notice: Subject to any disclaimer, the term of this patent is extended or adjusted under 35 U.S.C. 154(b) by 784 days.

(21) Appl. No.: 18/330,383

(22) Filed: Jun. 7, 2023

(65) Prior Publication Data

US 2024/0186053 A1 Jun. 6, 2024

(51) Int. Cl.
*H01F 27/28* (2006.01)
*H01F 27/26* (2006.01)
*H01F 27/30* (2006.01)

(52) U.S. Cl.
CPC ......... *H01F 27/263* (2013.01); *H01F 27/306* (2013.01)

(58) Field of Classification Search
CPC ........ H01F 27/263; H01F 27/306; H01F 3/10; H01F 3/14; H01F 27/38; H01F 27/40
USPC ...................................... 336/182, 221, 5–60
See application file for complete search history.

(56) References Cited

U.S. PATENT DOCUMENTS 4,129,820 A * 12/1978 Brock ...................... H01F 21/08 323/361
8,680,961 B2 * 3/2014 Yokota .................. H01F 27/022 336/212
2012/0299685 A1 * 11/2012 Yokota .................. H01F 27/263 336/212
2021/0110958 A1 4/2021 Liu et al.
2023/0290567 A1 * 9/2023 Betancourt Ramirez .................... H01F 29/04

FOREIGN PATENT DOCUMENTS

CN 106057431 A 10/2016

* cited by examiner

*Primary Examiner* — Shawki S Ismail
*Assistant Examiner* — Kazi S Hossain

(57) ABSTRACT

Disclosed is a transformer, including a first resonance coil, a primary coil, a secondary coil, a second resonance coil, and a magnetic core which includes a first base, a second base, a third base, a magnetic cover, a first center pillar, a second center pillar, a third center pillar, a fourth center pillar, a fifth center pillar, and a sixth center pillar. The first and second center pillars extend from the first base towards the second base. The third and fourth center pillars extend from the second base towards the third base. The fifth and sixth center pillars extend from the third base towards the magnetic cover. The first resonance coil surrounds the first and second center pillars. The primary coil surrounds the third and fourth center pillars. The secondary coil surrounds the third and fourth center pillars. The second resonance coil surrounds the fifth and sixth center pillars.

10 Claims, 7 Drawing Sheets

TRANSFORMER

CROSS REFERENCE TO RELATED PRESENT DISCLOSURE

This application claims the priority benefit of Chinese Patent Application Serial Number 202211554883.1, filed on Dec. 6, 2022, the full disclosure of which is incorporated herein by reference.

BACKGROUND

Technical Field

The present disclosure relates to the field of transformers, and in particular, to a transformer.

Related Art

In the prior art, in order to achieve the required symmetrical resonant tank gain, the two-phase LLC resonant converter adopted by the vehicle power supply is provided a transformer, a primary-side resonant inductance, and a secondary-side resonant inductance, and the total number of magnetic elements is three. However, the high magnetic loss between the transformer and the secondary side resonant inductance is caused by the path of the magnetic force lines. The magnetic loss causes the temperature of the magnetic core to rise, which affects the function of the magnetic core, so temperature control of the magnetic core is one of the problems to be solved.

SUMMARY

The embodiments of the present disclosure provide a transformer, which can solve the problem of overheating of transformers.

In order to solve the above-mentioned technical problem, the present disclosure is implemented as follows.

In the first aspect, the present disclosure provides a transformer, which includes a magnetic core, a first resonance coil, a primary coil, a secondary coil, and a second resonance coil. The magnetic core includes a first base, a second base, a third base, a magnetic cover, a first center pillar, a second center pillar, a third center pillar, a fourth center pillar, a fifth center pillar, a sixth center pillar, a first side wall, a second side wall, and a third side wall. The second base and the third base are disposed between the first base and the magnetic cover, and the second base is disposed between the first base and the third base. The first center pillar, the second center pillar, and the first side wall extend from the first base towards the second base. The third center pillar, the fourth center pillar, and the second side wall extend from the second base towards the third base. The fifth center pillar, the sixth center pillar, and the third side wall extend from the third base towards the magnetic cover. The first resonance coil surrounds the first center pillar and the second center pillar. The primary coil surrounds the third center pillar and the fourth center pillar. The secondary coil surrounds the third center pillar and the fourth center pillar. The second resonance coil surrounds the fifth center pillar and the sixth center pillar.

In one embodiment, the first center pillar and the second center pillar are separated by a first inner distance, the first center pillar and the first side wall are separated by a first outer distance, and the first inner distance is shorter than the first outer distance.

In one embodiment, the third center pillar and the fourth center pillar are separated by a second inner distance, the third center pillar and the second side wall are separated by a second outer distance, and the second inner distance is shorter than the second outer distance.

In one embodiment, the fifth center pillar and the sixth center pillar are separated by a third inner distance, the fifth center pillar and the third side wall are separated by a third outer distance, and the third inner distance is shorter than the third outer distance.

In one embodiment, the magnetic core further includes a fourth side wall, a fifth side wall, and a sixth side wall, wherein the fourth side wall extends from the first base towards the second base, the first center pillar and the second center pillar are disposed between the first side wall and the fourth side wall, the fifth side wall extends from the second base towards the third base, the third center pillar and the fourth center pillar are disposed between the second side wall and the fifth side wall, the sixth side wall extends from the third base towards the magnetic cover, and the fifth center pillar and the sixth center pillar are disposed between the third side wall and the sixth side wall.

In one embodiment, the second center pillar and the fourth side wall are separated by a fourth outer distance, and the first inner distance is shorter than the fourth outer distance.

In one embodiment, the fourth center pillar and the fifth side wall are separated by a fifth outer distance, and the second inner distance is shorter than the fifth outer distance.

In one embodiment, the sixth center pillar and the sixth side wall are separated by a sixth outer distance, and the third inner distance is shorter than the sixth outer distance.

In one embodiment, the first base has a first hole, the second base has a second hole, the third base has a third hole, the magnetic cover has a fourth hole, and the first hole, the second hole, the third hole and the fourth hole are mutually connected.

In the second aspect, the present disclosure provides another transformer, which includes a magnetic core, a first resonance coil, a primary coil, a secondary coil and a second resonance coil. The magnetic core includes a first base, a second base, a third base, a magnetic cover, a first center pillar, a second center pillar, a third center pillar, a fourth center pillar, a fifth center pillar, a sixth center pillar, a first side wall, a second side wall, a third side wall, a fourth side wall, a fifth side wall, and a sixth side wall. The second base and the third base are disposed between the first base and the magnetic cover, and the second base is disposed between the first base and the third base. The first center pillar, the second center pillar, the first side wall, and the fourth side wall extend from the first base towards the second base, and the first center pillar and the second center pillar are disposed between the first side wall and the fourth side wall. The third center pillar, the fourth center pillar, the second side wall, and the fifth side wall extend from the second base towards the third base, and the third center pillar and the fourth center pillar are disposed between the second side wall and the fifth side wall. The fifth center pillar, the sixth center pillar, the third side wall, and the sixth side wall extend from the third base towards the magnetic cover, and the fifth center pillar and the sixth center pillar are disposed between the third side wall and the sixth side wall. The first resonance coil surrounds the first center pillar and the second center pillar. The primary coil surrounds the third center pillar and the fourth center pillar. The secondary coil surrounds the third center pillar and the fourth center pillar. The second resonance coil surrounds the fifth center pillar and the sixth center pillar.

The present disclosure provides a transformer, wherein each coil surrounds the two center pillars of the magnetic core, so that the area where high temperature is likely to be caused by the coils and the center pillars can be ventilated, to achieve the heat dissipation effect.

DETAILED DESCRIPTION OF THE EMBODIMENTS

The embodiments of the present disclosure will be described below in conjunction with the relevant drawings. For clarity, many implementation details are included in the description below. However, it should be understood that these implementation details should not be used to limit the present disclosure. In the following embodiments, the same or similar components are denoted by the same reference numbers.

Figure 1:
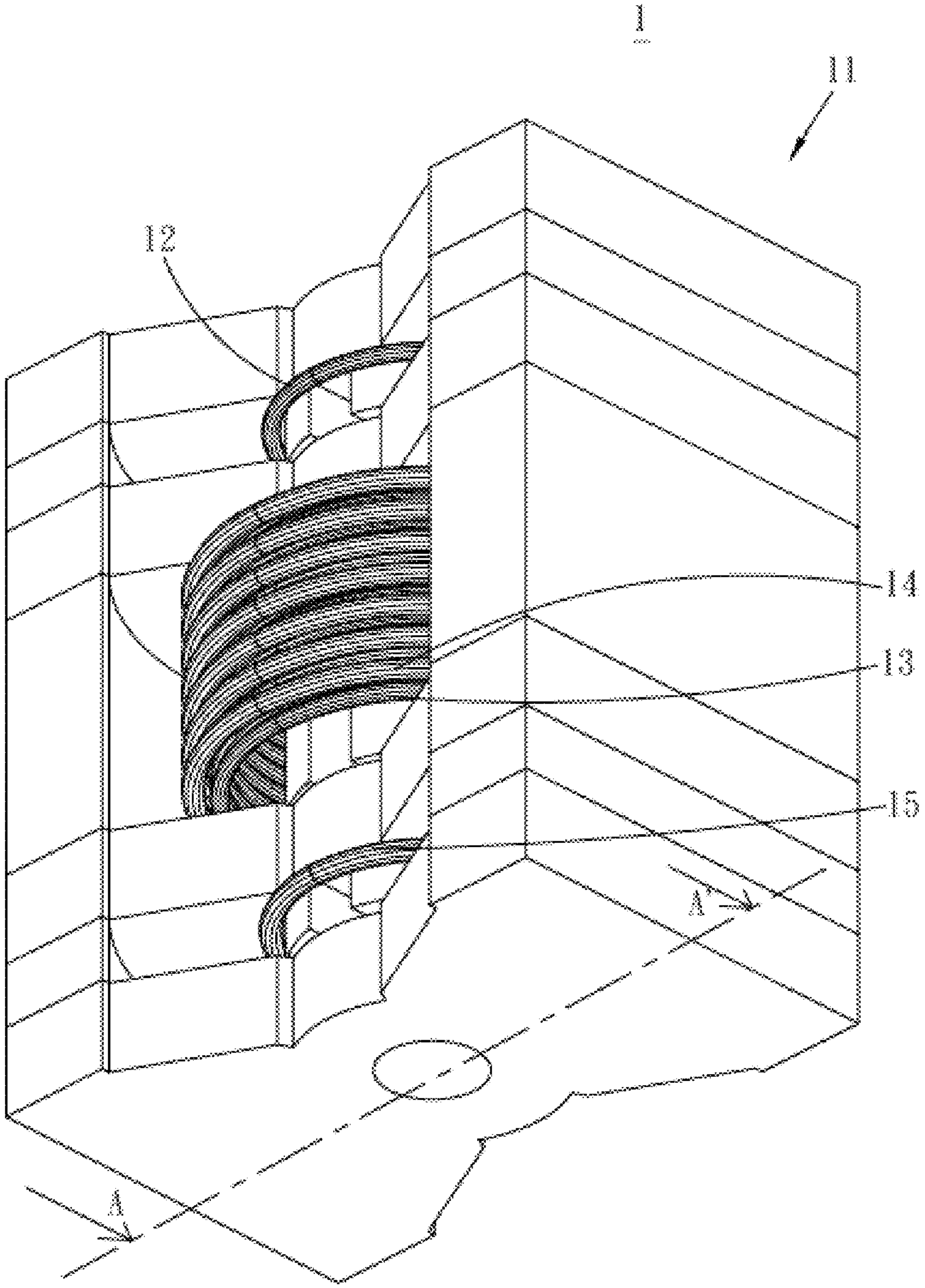
FIG. 1 shows a transformer of the present disclosure.
Figure 2:
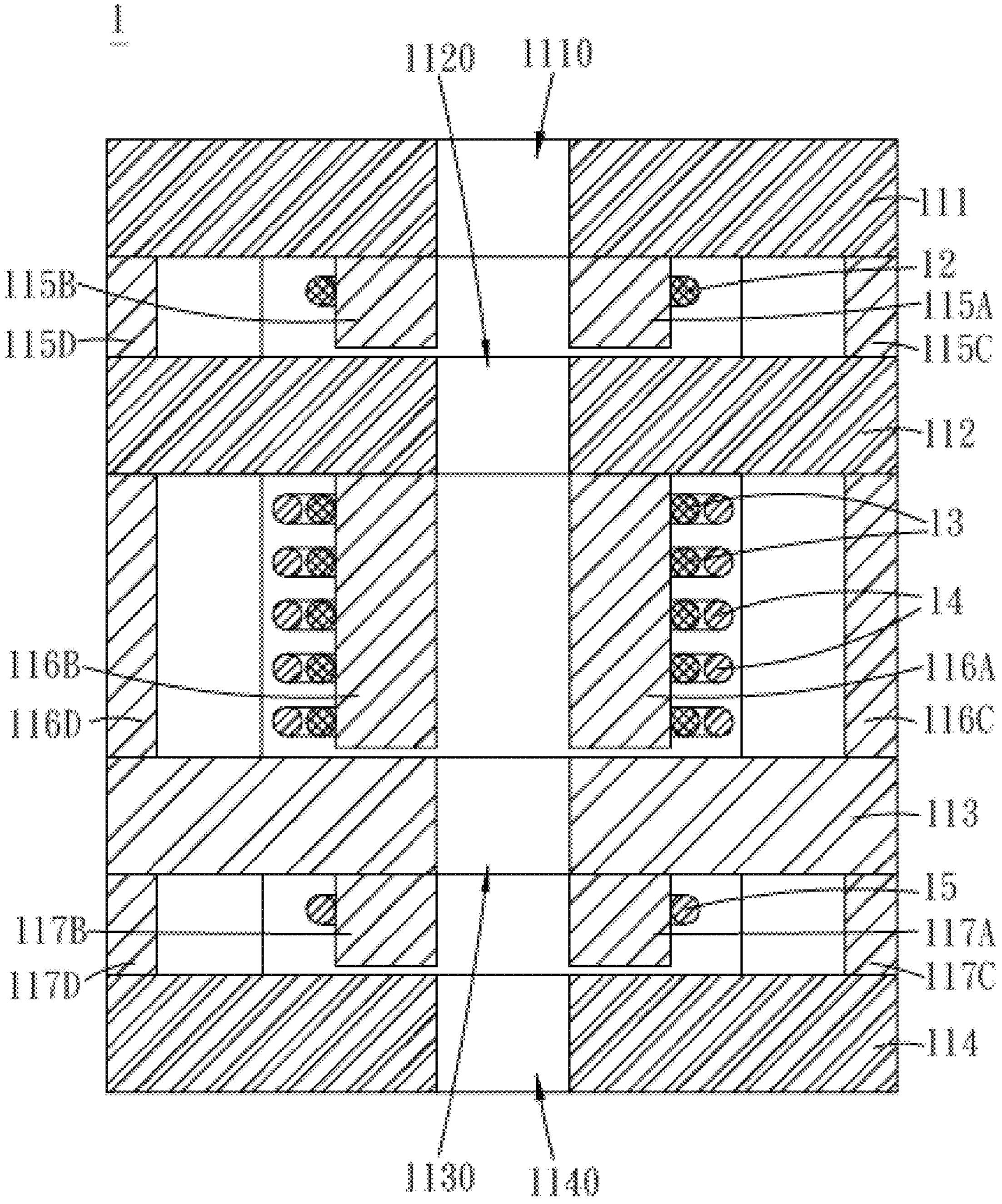
FIG. 2 is a sectional view along the line A-A' in FIG. 1.

Please refer to FIG. 1 and FIG. 2. FIG. 1 shows a transformer of the present disclosure. FIG. 2 is a sectional view along the line A-A' in FIG. 1. As shown in the figures, in this embodiment, a transformer 1 comprises a magnetic core 11, a first resonance coil 12, a primary coil 13, a secondary coil 14, and a second resonance coil 15. The magnetic core 11 comprises a first base 111, a second base 112, a third base 113, a magnetic cover 114, a first center pillar 115A, a second center pillar 115B, a third center pillar 116A, a fourth center pillar 116B, a fifth center pillar 117A, a sixth center pillar 117B, a first side wall 115C, a second side wall 116C, and a third side wall 117C. The second base 112 and the third base 113 are disposed between the first base 111 and the magnetic cover 114, the second base 112 is disposed between the first base 111 and the third base 113, and the first center pillar 115A, the second center pillar 115B, and the first side wall 115C extend from the first base 111 towards the second base 112. The third center pillar 116A, the fourth center pillar 116B, and the second side wall 116C extend from the second base 112 towards the third base 113. The fifth center pillar 117A, the sixth center pillar 117B, and the third side wall 117C extend from the third base 113 towards the magnetic cover 114. The first resonance coil 12 surrounds the first center pillar 115A and the second center pillar 115B. The primary coil 13 surrounds the third center pillar 116A and the fourth center pillar 116B. The secondary coil 14 surrounds the third center pillar 116A and the fourth center pillar 116B. The second resonance coil 15 surrounds the fifth center pillar 117A and the sixth center pillar 117B.

Figure 3:
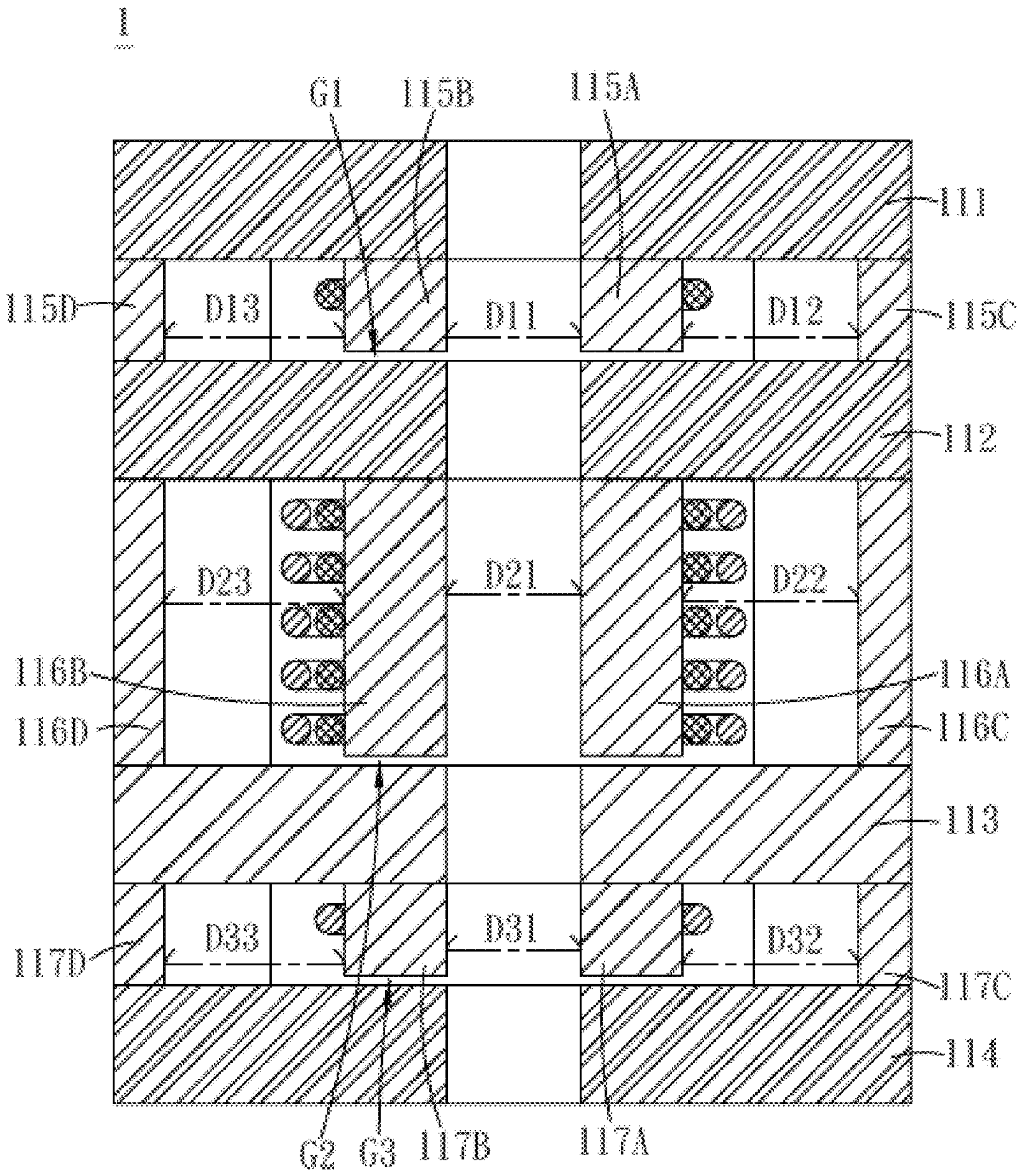
FIG. 3 is another sectional view along the line A-A' in FIG. 1.

Please also refer to FIG. 3. FIG. 3 is another sectional view along the line A-A' in FIG. 1. As shown in the figures, in this embodiment, the first center pillar 115A is adjacent to the second center pillar 115B, and the first side wall 115C is disposed on the outer side of the first center pillar 115A and the second center pillar 115B. The first center pillar 115A and the second center pillar 115B are separated by a first inner distance D11, the first center pillar 115A and the first side wall 115C are separated by a first outer distance D12, and the first inner distance D11 is shorter than the first outer distance D12. Moreover, the third center pillar 116A is adjacent to the fourth center pillar 116B, and the second side wall 116C is disposed on the outer side of the third center pillar 116A and the fourth center pillar 116B. The third center pillar 116A and the fourth center pillar 116B are separated by a second inner distance D21, the third center pillar 116A and the second side wall 116C are separated by a second outer distance D22, and the second inner distance D21 is shorter than the second outer distance D22. Furthermore, the fifth center pillar 117A is adjacent to the sixth center pillar 117B, and the third side wall 117C is disposed on the outer side of the fifth center pillar 117A and the sixth center pillar 117B. The fifth center pillar 117A and the sixth center pillar 117B are separated by a third inner distance D31, the fifth center pillar 117A and the third side wall 117C are separated by a third outer distance D32, and the third inner distance D31 is shorter than the third outer distance D32.

Please refer to FIG. 2 and FIG. 3 again. Furthermore, the magnetic core 11 further comprises a fourth side wall 115D, a fifth side wall 116D and a sixth side wall 117D. The fourth side wall 115D extends from the first base 111 towards the second base 112, and the first center pillar 115A and the second center pillar 115B are disposed between the first side wall 115C and the fourth side wall 115D. The fifth side wall 116D extends from the second base 112 towards the third base 113, and the third center pillar 116A and the fourth center pillar 116B are disposed between the second side wall 116C and the fifth side wall 116D. The sixth side wall 117D extends from the third base 113 towards the magnetic cover 114, and the fifth center pillar 117A and the sixth center pillar 117B are disposed between the third side wall 117C and the sixth side wall 117D.

As mentioned above, the first center pillar 115A and the second center pillar 115B are disposed between the first side wall 115C and the fourth side wall 115D, the first center pillar 115A is adjacent to the first side wall 115C, and the second center pillar 115B is adjacent to the fourth side wall 115D. The second center pillar 115B and the fourth side wall 115D are separated by a fourth outer distance D13, and the first inner distance D11 is shorter than the fourth outer distance D13. Moreover, the third center pillar 116A and the fourth center pillar 116B are disposed between the second side wall 116C and the fifth side wall 116D, the third center pillar 116A is adjacent to the second side wall 116C, the fourth center pillar 116B is adjacent to the fifth side wall 116D, the fourth center pillar 116B and the fifth side wall 116D are separated by a fifth outer distance D23, and the second inner distance D21 is shorter than the fifth outer distance D23. Furthermore, the fifth center pillar 117A and the sixth center pillar 117B are disposed between the third side wall 117C and the sixth side wall 117D, the fifth center pillar 117A is adjacent to the third side wall 117C, the sixth center pillar 117B is adjacent to the sixth side wall 117D, the sixth center pillar 117B and the sixth side wall 117D are separated by a sixth outer distance D33, and the third inner distance D31 is shorter than the sixth outer distance D33.

In addition, one end of the first center pillar 115A and one end of the second center pillar 115B extend towards the second base 112, and there is a first gap G1 between the one end of the first center pillar 115A and the second base 112, and between the one end of the second center pillar 115B and the second base 112. One end of the third center pillar 116A and one end of the fourth center pillar 116B extend towards the third base 113, and there is a second gap G2 between the one end of the third center pillar 116A and the third base 113, and between the one end of the fourth center pillar 116B and the third base 113. One end of the fifth center pillar 117A and one end of the sixth center pillar 117B extend towards the magnetic cover 114, and there is a third gap G3 between the one end of the fifth center pillar 117A and the magnetic cover 114, and between the one end of the sixth center pillar 117B and the magnetic cover 114.

Furthermore, the first base 111 has a first hole 1110. The second base 112 has a second hole 1120. The third base 113 has a third hole 1130. The magnetic cover 114 has a fourth hole 1140. The first hole 1110, the second hole 1120, the third hole 1130, and the fourth hole 1140 are mutually connected. In this way, air can circulate through the above-mentioned holes, thereby improving the heat dissipation effect of the magnetic core 11. In addition, in this embodiment, the heat dissipation effect can also be improved by implementing water cooling (glue pouring) in the above-mentioned holes.

Figure 4:
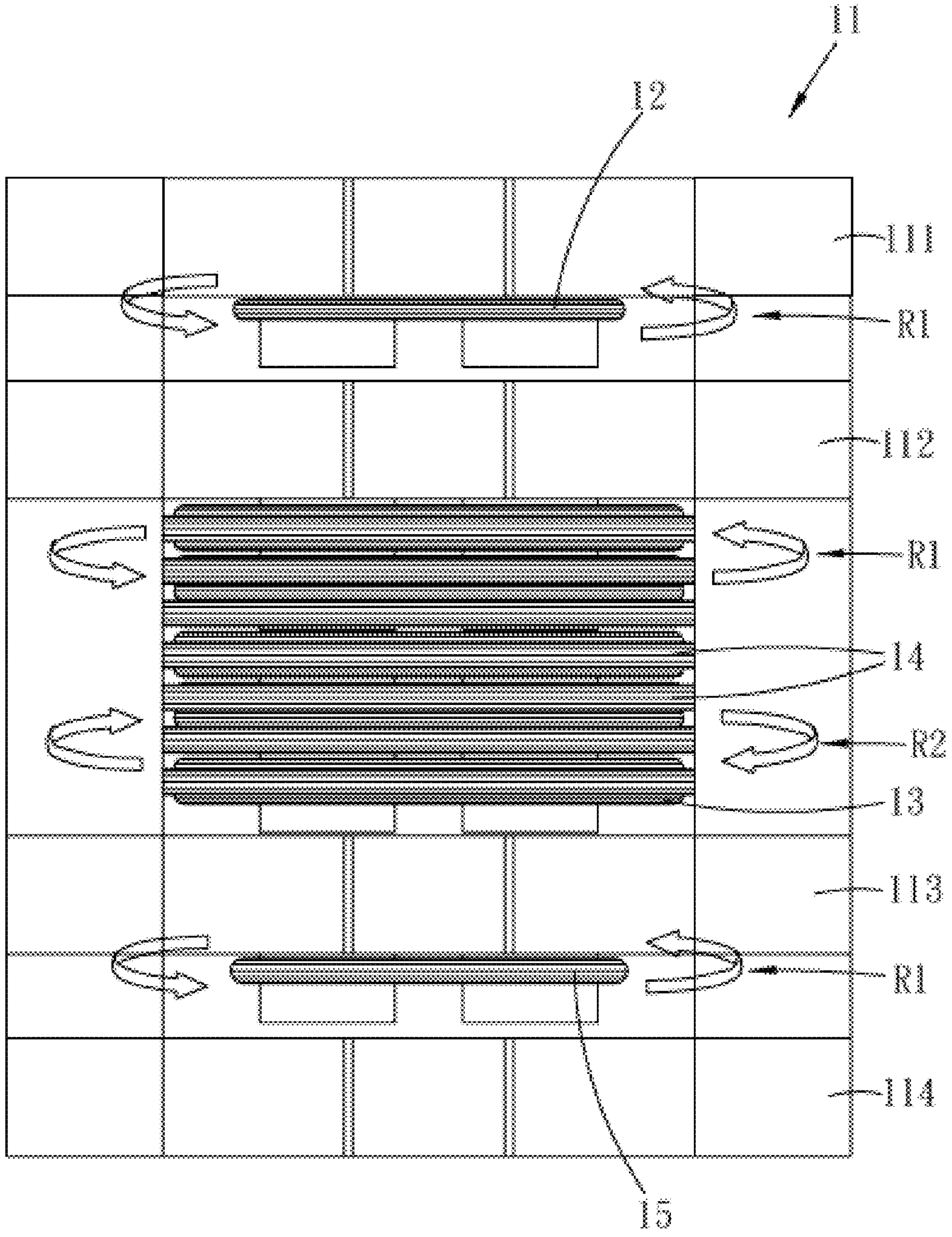
FIG. 4 shows the coils of the transformer of the present disclosure.

Please also refer to FIG. 4. FIG. 4 shows the coils of the transformer of the present disclosure. As shown in FIG. 4, in this embodiment, the first resonance coil 12 surrounds the first center pillar 115A and the second center pillar 115B in a first direction R1. The primary coil 13 surrounds the third center pillar 116A and the fourth center pillar 116B in the first direction R1. The first resonance coil 12 and the primary coil 13 are electrically connected to each other. The secondary coil 14 surrounds the third center pillar 116A and the fourth center pillar 116B in a second direction R2. The second resonance coil 15 surrounds the fifth center pillar 117A and the sixth center pillar 117B in the first direction R1. The second resonance coil 15 and the secondary coil 14 are electrically connected to each other. The first direction R1 and the second direction R2 are mutually opposite directions, the first direction R1 is a counterclockwise direction, and the second direction R2 is a clockwise direction.

Figure 5:
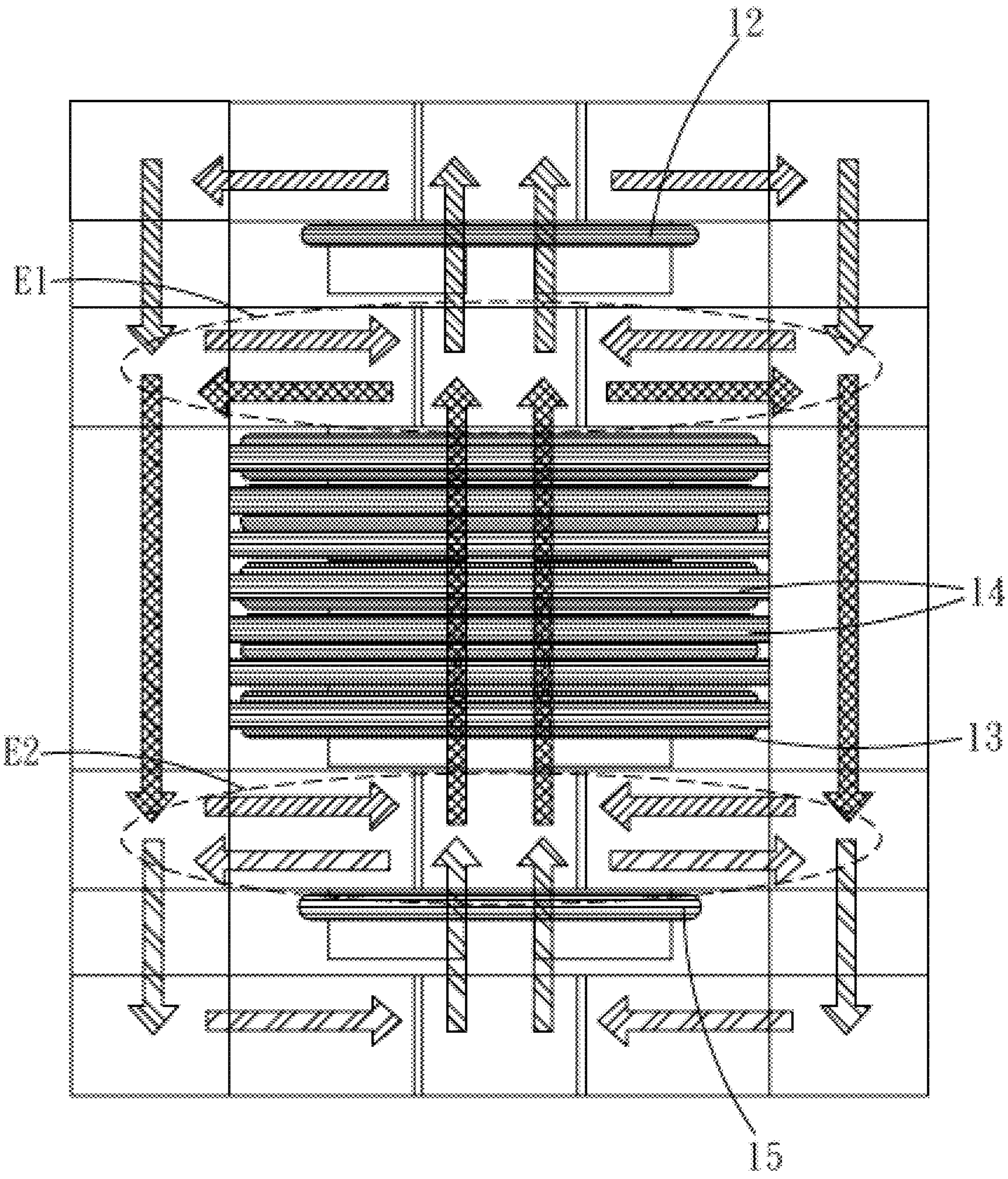
FIG. 5 shows magnetic flux paths of the transformer of the present disclosure.
Figure 6:
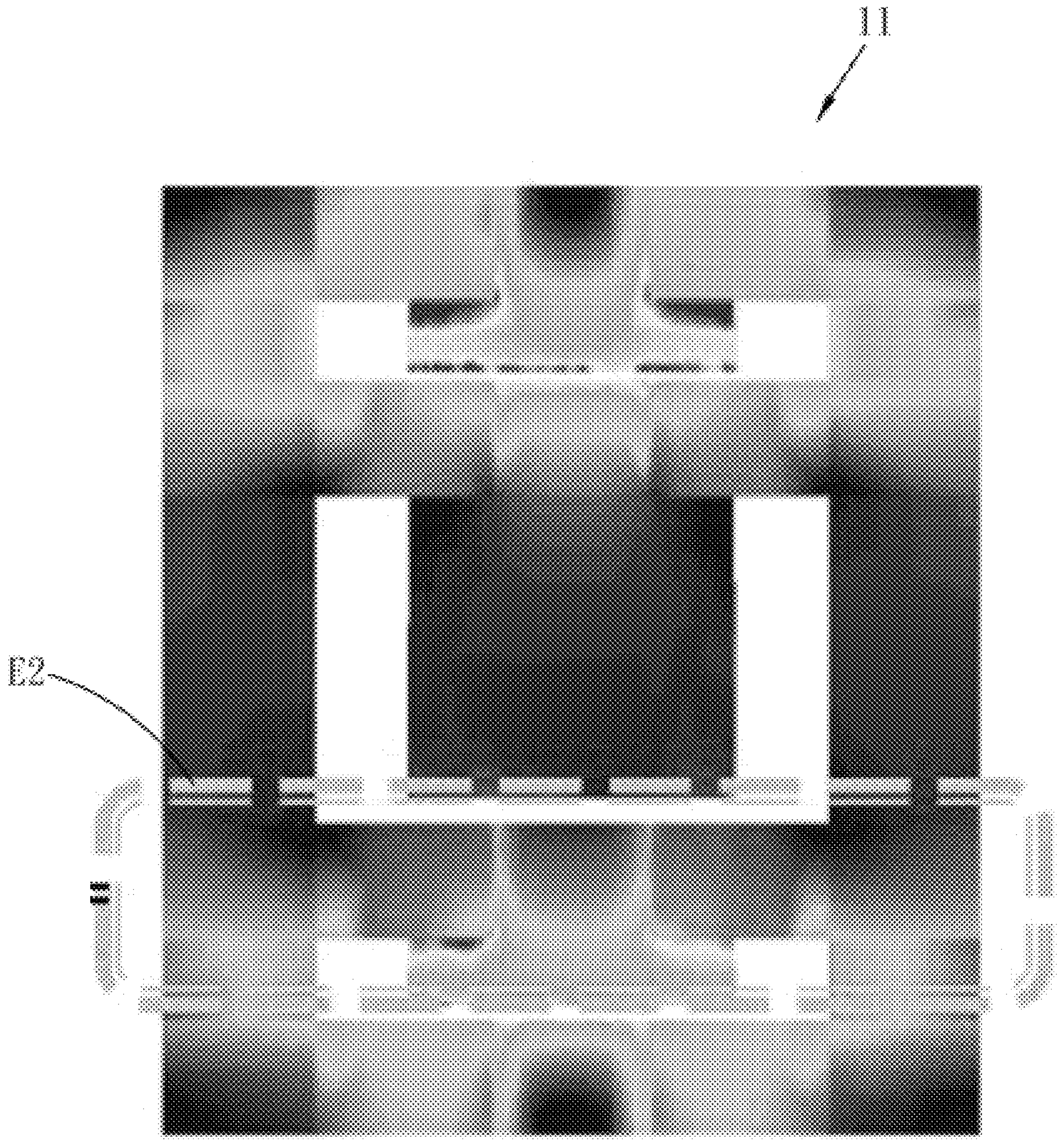
FIG. 6 shows temperature of the transformer of the present disclosure.

Please also refer to FIG. 5 and FIG. 6. FIG. 5 shows magnetic flux paths of the transformer of the present disclosure. FIG. 6 shows temperature of the transformer of the present disclosure. As shown in the figures, in this embodiment, the first resonance coil 12 on the primary side of the transformer is wound in a counterclockwise direction. The primary coil 13 is wound in a counterclockwise direction. The secondary coil 14 is wound in a clockwise direction. The second resonance coil 15 on the secondary side of the transformer is wound in a counterclockwise direction. When the transformer is in use, there are opposite magnetic flux paths between the first resonance coil 12 and the primary coil 13, so the magnetic flux in the E1 region is canceled out to reduce the loss of the magnetic core 11. At the same time, there are also opposite magnetic flux paths between the second resonance coil 15 and the primary coil 13, the magnetic flux in the E2 area is also canceled out, and the magnetic loss of the magnetic core 11 is also reduced.

The secondary coil 14 is wound in the clockwise direction, and the second resonance coil 15 is wound in the counterclockwise direction, so that the magnetic loss of the magnetic core 11 is reduced from 2.82 W to 2.25 W, which is a drop of 25%. Under no wind conditions, the average temperature of the magnetic core can be reduced from 98 degrees Celsius to 94 degrees Celsius. In the state of wind speed of 0.5 m/s, the average temperature of the magnetic core can be reduced from 57 degrees Celsius to 54 degrees Celsius.

Figure 7:
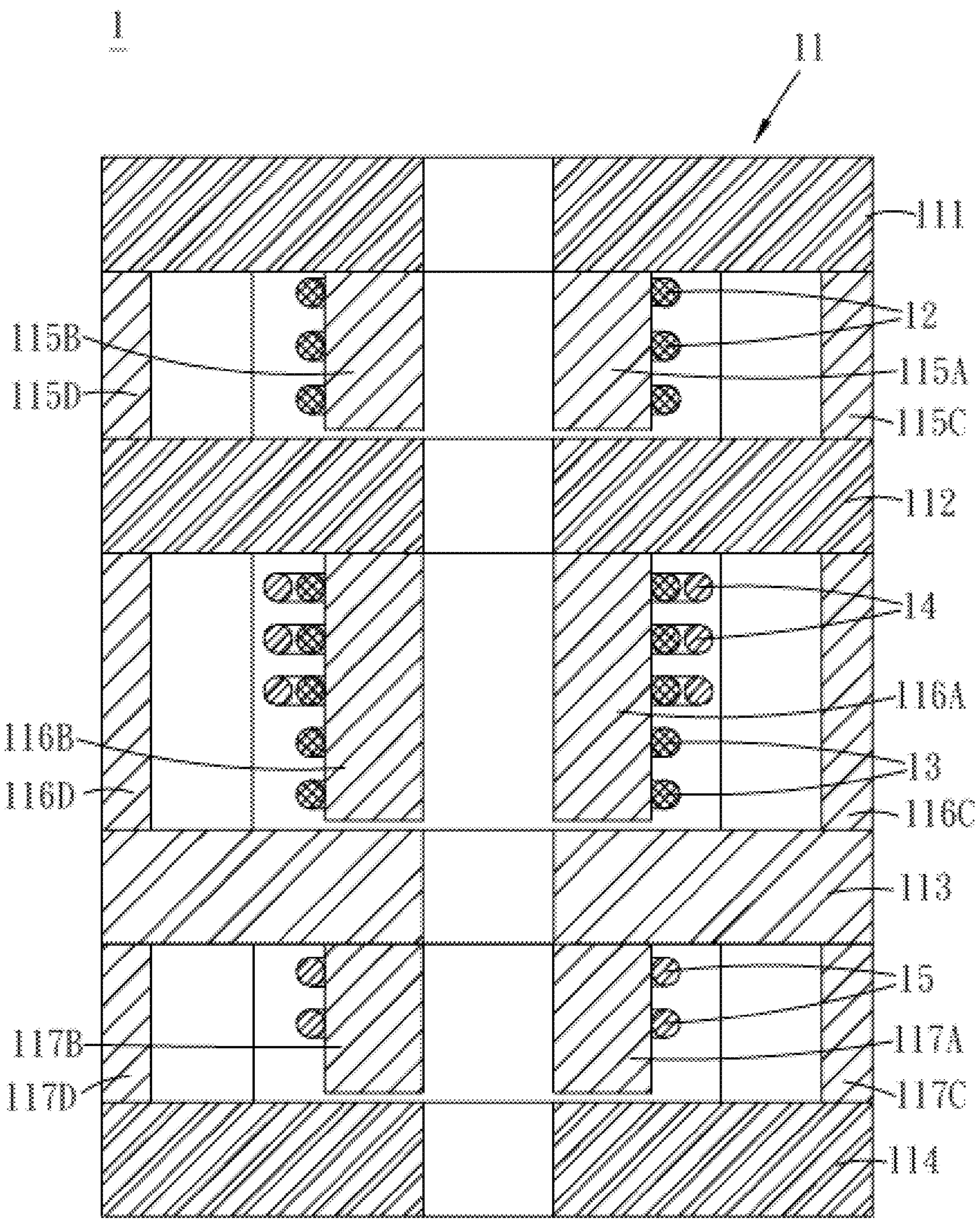
FIG. 7 is another sectional view of the transformer of the present disclosure.

FIG. 7 is another sectional view of the transformer of the present disclosure. As shown in FIG. 7, the number of turns of the first resonance coil 12 of the transformer 1 wound around the first center pillar 115A and the second center pillar 115B is greater than the number of turns of the second resonance coil 15 wound around the fifth center pillar 117A and the sixth center pillar 117B. The number of turns of the first resonance coil 12 is greater than the number of turns of the second resonance coil 15, so that the resonant inductance of the first resonance coil 12 is greater than the resonant inductance of the second resonance coil 15. The number of turns of the primary coil 13 wound around the third center pillar 116A and the fourth center pillar 116B is greater than the number of turns of the secondary coil 14 wound around the third center pillar 116A and the fourth center pillar 116B. The number of turns of the primary coil 13 is greater than the number of turns of the secondary coil 14, so that the voltage on the secondary side of the transformer 1 is relatively low, and the voltage can be reduced.

In summary, the present disclosure provides a transformer, wherein each coil surrounds the two center pillars of the magnetic core, so that the area where high temperature is likely to be caused by the coils and the center pillars can be ventilated, to achieve the heat dissipation effect.

It should further be noted that the term "include," "comprise," or any other variation thereof is intended to encompass a non-exclusive inclusion, so that a process, method, commodity, or device that includes a series of elements includes not only those elements but also other elements not explicitly listed, or elements that are inherent to such a process, method, commodity, or device. The element defined by the statement "including one . . . ," without further limitation, does not preclude the presence of additional identical elements in the process, method, commodity, or device that includes the element.

The foregoing description illustrates and describes several preferred embodiments of the present disclosure. However, it should be understood that the present disclosure is not limited to the form disclosed herein, should not be regarded as an exclusion of other embodiments, but may be used in a variety of other combinations, modifications and environments, and can be modified within the scope of the invention concept described herein, by the above teachings or related fields of technology or knowledge. Modifications and variations made by those skilled in the art without departing from the spirit and scope of the present disclosure should fall within the scope of the present disclosure defined by the appended claims.

What is claimed is:

1. A transformer, comprising:

a magnetic core, comprising:

a first base, a second base, a third base, a magnetic cover, a first center pillar, a second center pillar, a third center pillar, a fourth center pillar, a fifth center pillar, a sixth center pillar, a first side wall, a second side wall, and a third side wall;

wherein the second base and the third base are disposed between the first base and the magnetic cover; the second base is disposed between the first base and the third base; the first center pillar, the second center pillar, and the first side wall extend from the first base towards the second base; the third center pillar, the fourth center pillar, and the second side wall extend from the second base towards the third base; and the fifth center pillar, the sixth center pillar, and the third side wall extend from the third base towards the magnetic cover;

a first resonance coil surrounding the first center pillar and the second center pillar in a first direction;

a primary coil surrounding the third center pillar and the fourth center pillar in the first direction;

a secondary coil surrounding the third center pillar and the fourth center pillar in a second direction, wherein the first direction and the second direction are mutually opposite directions; and a second resonance coil surrounding the fifth center pillar and the sixth center pillar in the first direction.

2. The transformer according to claim 1, wherein the first center pillar and the second center pillar are separated by a first inner distance, the first center pillar and the first side wall are separated by a first outer distance, and the first inner distance is shorter than the first outer distance.

3. The transformer according to claim 2, wherein the third center pillar and the fourth center pillar are separated by a second inner distance, the third center pillar and the second side wall are separated by a second outer distance, and the second inner distance is shorter than the second outer distance.

4. The transformer according to claim 3, wherein the fifth center pillar and the sixth center pillar are separated by a third inner distance, the fifth center pillar and the third side wall are separated by a third outer distance, and the third inner distance is shorter than the third outer distance.

5. The transformer according to claim 4, wherein the magnetic core further comprises:

a fourth side wall;

a fifth side wall; and a sixth side wall;

wherein the fourth side wall extends from the first base towards the second base, the first center pillar and the second center pillar are disposed between the first side wall and the fourth side wall, the fifth side wall extends from the second base towards the third base, the third center pillar and the fourth center pillar are disposed between the second side wall and the fifth side wall, the sixth side wall extends from the third base towards the magnetic cover, and the fifth center pillar and the sixth center pillar are disposed between the third side wall and the sixth side wall.

6. The transformer according to claim 5, wherein the second center pillar and the fourth side wall are separated by a fourth outer distance, and the first inner distance is shorter than the fourth outer distance.

7. The transformer according to claim 5, wherein the fourth center pillar and the fifth side wall are separated by a fifth outer distance, and the second inner distance is shorter than the fifth outer distance.

8. The transformer according to claim 5, wherein the sixth center pillar and the sixth side wall are separated by a sixth outer distance, and the third inner distance is shorter than the sixth outer distance.

9. The transformer according to claim 1, wherein the first base has a first hole, the second base has a second hole, the third base has a third hole, and the magnetic cover has a fourth hole, and the first hole, the second hole, the third hole, and the fourth hole are mutually connected.

10. A transformer, comprising:

a magnetic core, comprising:

a first base, a second base, a third base, a magnetic cover, a first center pillar, a second center pillar, a third center pillar, a fourth center pillar, a fifth center pillar, a sixth center pillar, a first side wall, a second side wall, a third side wall, a fourth side wall, a fifth side wall, and a sixth side wall;

wherein the second base and the third base are disposed between the first base and the magnetic cover; the second base is disposed between the first base and the third base; the first center pillar, the second center pillar, the first side wall, and the fourth side wall extend from the first base towards the second base; the first center pillar and the second center pillar are disposed between the first side wall and the fourth side wall; the third center pillar, the fourth center pillar, the second side wall, and the fifth side wall extend from the second base towards the third base; the third center pillar and the fourth center pillar are disposed between the second side wall and the fifth side wall; the fifth center pillar, the sixth center pillar, the third side wall, and the sixth side wall extend from the third base towards the magnetic cover; and the fifth center pillar and the sixth center pillar are disposed between the third side wall and the sixth side wall;

a first resonance coil surrounding the first center pillar and the second center pillar in a first direction;

a primary coil surrounding the third center pillar and the fourth center pillar in the first direction;

a secondary coil surrounding the third center pillar and the fourth center pillar in a second direction, wherein the first direction and the second direction are mutually opposite directions; and a second resonance coil surrounding the fifth center pillar and the sixth center pillar in the first direction.

* * * * *